UNITED STATES PATENT OFFICE.

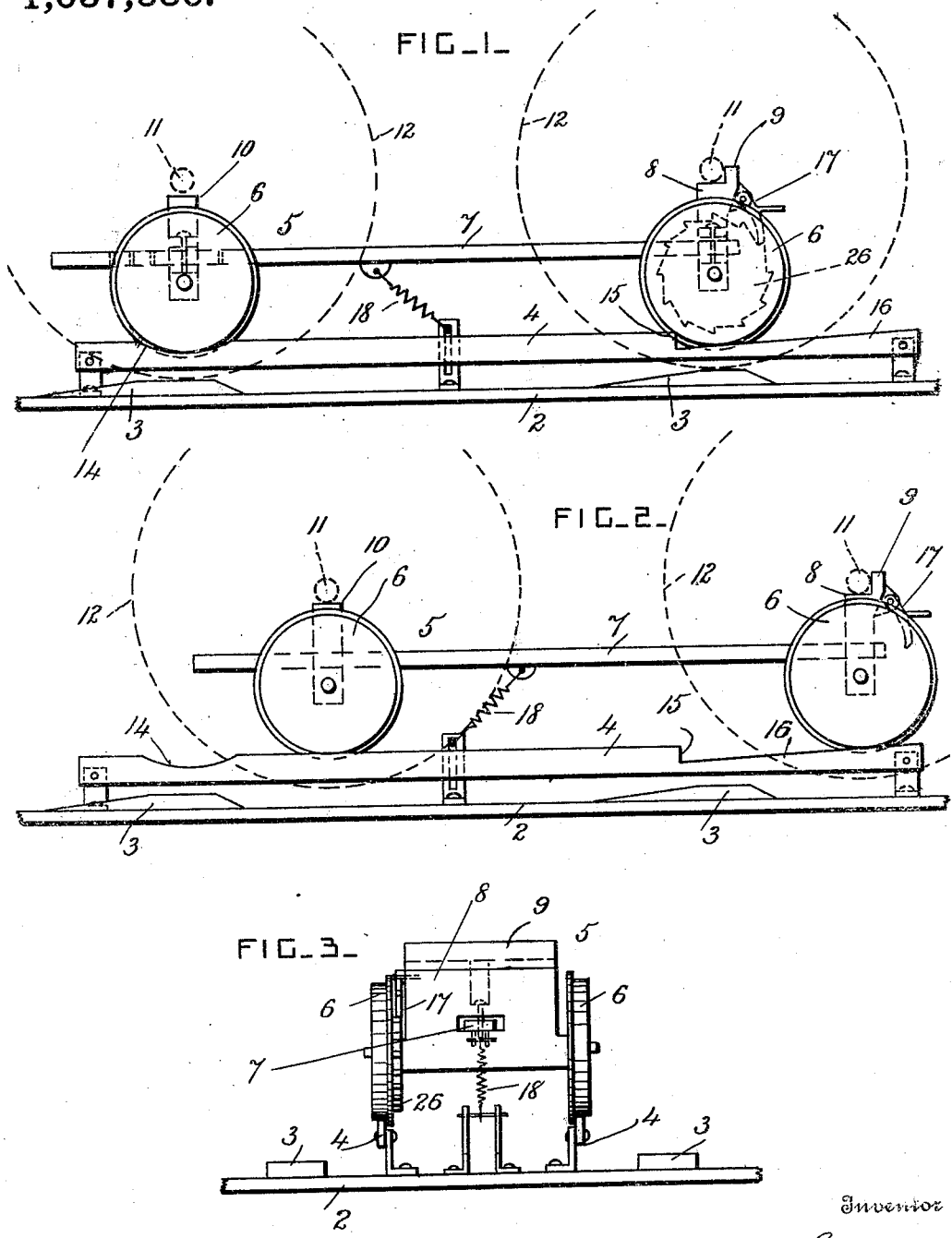

CHARLES W. SCHUBERT, OF COTTONWOOD, IOWA.

SUPPORT FOR MOTOR-CARS.

1,037,336.

Specification of Letters Patent.     Patented Sept. 3, 1912.

Application filed November 4, 1911. Serial No. 658,608.

*To all whom it may concern:*

Be it known that I, CHARLES W. SCHUBERT, a citizen of the United States, residing at Cottonwood, in the county of Lee and State of Iowa, have invented certain new and useful Improvements in Supports for Motor-Cars; and I do hereby declare the following to be a full, clear, and exact description of the invention, such as will enable others skilled in the art to which it appertains to make and use the same.

This invention relates to devices for supporting motor cars when not in use, so that the tires of their road-wheels are relieved of the weight of the car; and it consists in the novel construction and combination of the parts hereinafter fully described and claimed.

In the drawings, Figure 1 is a side view of the supporting devices, arranged in position to receive the car. Fig. 2 is a similar view but shows the truck moved endwise so as to support the car wheels clear of the floor. Fig. 3 is an end view of the supporting devices.

A flat support 2 is provided, and this support is usually the floor of a garage in which the motor car is kept. Four inclined planes 3 are provided and are secured to the floor in pairs at suitable distances apart, both laterally and longitudinally, so that the four road-wheels of the car may engage with all of them simultaneously. Two longitudinal guide rails 4 are secured to the floor between the two pairs of inclined planes, and these rails are parallel to the surface of the floor for the greater part of their length.

A truck 5 of any approved construction and material is provided, and this truck has rail-wheels 6 which run on the guide rails 4. The truck axles are preferably connected by a pivoted reach 7, but any approved form of truck frame may be used, such as a rigid frame or a frame having more than one pivoted reach. A truck provided with a reach is preferred, as its end portions have lateral movement independent of each other and adapt themselves more readily to different positions, and because the distance between its end portions can be adjusted.

The end portions of the truck frame are provided respectively with a front block 8 having an upwardly projecting lip 9, and a rear block 10. These blocks are spaced to suit the distance between the axles 11 and road wheels 12 of the motor car, which are indicated in dotted lines.

The axles 11, or any equivalent portions of the car, or any specially constructed portions secured to the car, are arranged to rest on the blocks 8 and 10. The guide rails are provided with curved recesses 14 for locating the normal position of the rear wheels, and 15 are stop shoulders in the rails which prevent the front wheels from running back too far. Inclined surfaces 16 are formed in the rails in front of the shoulders 15 to let the truck run back easily. A ratchet toothed wheel 26 is secured on the front axle of the truck, and 17 is a pawl pivoted to the truck frame and engaging with the wheel 26. This pawl permits the truck to be moved forward, but prevents it from moving backward until the pawl is raised. A spring buffer 18 is provided for limiting the longitudinal movements or travel of the truck in each direction.

The motor car is driven into the garage when the truck is in the position shown in Fig. 1. The front road-wheels ascend the two rear inclined planes, and the front axle passes over the rear block of the truck without touching it. As the car continues its forward movement its four road-wheels ascend the four inclined planes simultaneously, and the front axle of the car strikes the lip 9 on the front block, and moves the truck forward to the position shown in Fig. 2, the momentum of the car being sufficient to carry its road-wheels beyond the upper ends of the inclined planes. The higher ends of the inclined planes are rounded or inclined, and when the car wheels have passed off the inclined planes the car rests on the blocks 8 and 10, so that the pneumatic tires of the car wheels do not touch the floor, and are relieved of the weight of the car.

The inclined planes are made of a length sufficient to enable the car wheels to ascend them easily, and they are much longer than the width of the blocks 8 and 10.

What I claim is:

1. The combination, with a supporting floor provided with inclined planes spaced so as to engage with the wheels of a motor car, of guide rails arranged parallel with the inclined planes and having shoulders and upwardly and forwardly inclined parts at their front end portions, a truck provided with means for supporting the motor car and having rear wheels which run on the rear portions of the said rails and front wheels which run on their inclined portions and which normally rest against the said shoulders.

2. The combination, with a supporting floor provided with inclined planes spaced so as to engage with the wheels of a motor car, of a truck arranged to run longitudinally of the inclined planes and provided with means for supporting the motor car, and check mechanism attached to the truck and normally permitting it to run in one direction only.

3. The combination, with a supporting floor provided with inclined planes spaced so as to engage with the wheels of a motor car, of a truck arranged to run longitudinally of the inclined planes and provided with means for supporting the motor car, and a spring connection between the said truck and the floor for retarding the movements of the truck as it approaches the ends of its longitudinal path.

4. The combination, with a supporting floor provided with inclined planes spaced so as to engage with the wheels of a motor car, of guide rails arranged longitudinally between the inclined planes and provided with depressions, a truck provided with means for supporting the motor car and having wheels which run on the said rails and which normally engage with its depressions, said truck having a projection whereby it is moved forwardly from its normal position by the said car, and check mechanism attached to the said truck and normally preventing it from moving backwardly after it has been moved forwardly by the car.

In testimony whereof I have affixed my signature in the presence of two witnesses.

CHARLES W. SCHUBERT.

Witnesses:
A. E. DICK,
CHRIS. MEIEROTTO.

---

Copies of this patent may be obtained for five cents each, by addressing the "Commissioner of Patents, Washington, D. C."